(12) United States Patent
Hur et al.

(10) Patent No.: US 6,527,994 B1
(45) Date of Patent: Mar. 4, 2003

(54) METHOD FOR PREPARING ARTIFICIAL MARBLE OF WAVE/WOOD PATTERN

(75) Inventors: Dae-Young Hur, Chungchurngbok-do (KR); In-Su Kim, Chungchurngbok-do (KR); Kyung-Whan Kim, Chungchurngbok-do (KR)

(73) Assignee: Hanwha L&C Corporation, Seoul (KR)

( * ) Notice: Subject to any disclaimer, the term of this patent is extended or adjusted under 35 U.S.C. 154(b) by 232 days.

(21) Appl. No.: 09/686,240

(22) Filed: Oct. 11, 2000

(30) Foreign Application Priority Data

Dec. 11, 1999 (KR) .............................. 99-56913
Jul. 24, 2000 (KR) .............................. 00-42456

(51) Int. Cl.[7] .............................................. B29C 39/12
(52) U.S. Cl. ..................... 264/73; 264/75; 425/133.5
(58) Field of Search ..................... 264/73, 75, 211.12; 425/133.5

(56) References Cited

U.S. PATENT DOCUMENTS 5,837,175 A   11/1998   Mukai et al. ................ 264/73

FOREIGN PATENT DOCUMENTS

| JP | 7-205338 | * | 8/1995 |
| JP | 10323848 | | 8/1998 |
| JP | 11291267 | | 10/1999 |
| JP | 11291268 | | 10/1999 |

* cited by examiner

Primary Examiner—Suzanne E. McDowell
Assistant Examiner—Edmund H. Lee
(74) Attorney, Agent, or Firm—Abelman, Frayne & Schwab

(57) ABSTRACT

Disclosed is a method for preparing artificial acrylic marble of wave/wood patterns by use of an apparatus comprising a rotational body and a liquid resin feeder. The liquid resin feeder comprises at least two liquid resin inlets, a single liquid resin outlet, and a mobile molding belt. The rotational body has a rotating shaft with a plurality of spaced wings and is rotated clockwise or counterclockwise in the partially intermixed liquid resins on the mobile molding belt to form a wave/wood pattern while the liquid resins are cured. The wings are fixed along the shaft of the rotating body and alternately approach the bottom and the top of the liquid resins on the belt during the rotation of the rotating body. Thus, the artificial acrylic marble is provided with new patterns like wood and wave patterns and can be aesthetically harmonized with wood materials.

7 Claims, 3 Drawing Sheets

METHOD FOR PREPARING ARTIFICIAL MARBLE OF WAVE/WOOD PATTERN

BACKGROUND OF THE INVENTION

1. Field of the Invention

The present invention relates, in general, to a method for preparing artificial acrylic marble and, more particularly, to a method for newly providing a wave/wood pattern to artificial acrylic marble during its preparation.

2. Description of the Prior Art

Usually, artificial acrylic marble is prepared by curing in a mold a syrup comprising a monomer such as methylmethacrylate and its polymer in combination with a filler, such as calcium hydroxide, a pigment, a curing agent, and other additives.

Usable for the preparation of artificial marble are initiators, releasing agents, and dispersants. To express colors and/or figures, pigments and/or chips are used. Being the same as or different from a main component in the artificial marble, the chips have various colors and particle sizes (0.01–10 mm). The pigments are exemplified by zinc oxide white and iron oxide black. Additionally, pigments of various colors may be used. Pigments and chips may be used, alone or in combination, at an amount of 0.1–25% by weight based on the total weight of the composition.

With reference to FIG. 1, there is a conventional method for providing artificial marble as disclosed in U.S. Pat. No. 5,837,175. As seen in the figure, at least two resins 2 and 3, which are different in color, but similar to aforementioned composition of artificial marble, are laminated on a mold in such a way that the layers are apparently discriminated. Then, the multi-layer structure is striped by use of a comb-patterned tool 1 with wings 4.

Employment of a comb-patterned tool in preparing artificial marble is frequently found in many patents.

For example, Japanese Pat. Laid-Open Publication Nos. Heisei 10-323848 and 11-277552 disclose preparation methods of artificial marble, both of which are characterized in that a liquid resin, wherein colorant is non-uniformly dispersed, is allowed to underlay at least one liquid resin layer with a different color and the multi-layer structure is provided with a natural sense to the eye by using a comb-patterned tool which has wings of different sizes and gaps. Japanese Pat. Laid-Open Publication No. Heisei 11-291267 discloses a method for preparing an artificial marble with natural stripe patterns, in which stripe patterns of the artificial marble are formed by moving a bleeding forming means on the trace of passage of teeth of a comb-shaped tool, which is moved in liquid resin in a manner of combing laminated liquid resin. Also, in Japanese Pat. Laid-Open Publication No. Heisei 11-291268, there is introduced an apparatus capable of producing artificial marble continuously on an industrial scale. The apparatus comprises a mobile molding cell, a liquid resin feeder, and a comb-patterned tool. Equipped with a plurality of resin outlets and a non-stirring mixer in which liquid resins and colorants are mixed, the liquid resin feeder feeds the resin in a perpendicular direction to the moving direction of the cell.

The above methods and apparatuses can provide artificial marble with stripe patterns, which are, however, not regular nor reproducible. Thus, the resulting products are unbalanced and instable in whole design. In addition, the conventional techniques cannot express various patterns because the wings of the comb-patterned tool are changed only in size and gap.

SUMMARY OF THE INVENTION

Leading to the present invention, employment of a rotational body and a liquid resin feeder having a single resin outlet, from which at least two liquid resins different in color and viscosity from each other are fed with a partial intermixture, allows various patterns to be expressed on the artificial marble.

It is an object of the present invention to provide a method for preparing artificial acrylic marble, by which the artificial acrylic marble can be diversely patterned with various colors by adding novel pattern (wave pattern and/or wood pattern), compared with the conventional artificial acrylic marble having stripe patterns.

In accordance with the present invention, there is provided a method for preparing artificial acrylic marble by use of an apparatus comprising a rotational body and a liquid resin feeder, wherein the liquid resin feeder comprises; at least two liquid resin inlets for introducing at least two liquid resins into the feeder, said liquid resins being different in color and viscosity from each other and partially intermixed in the feeder; a single liquid resin outlet alternatively moving from side to side along the width of mobile molding belt for discharging the partially intermixed liquid resins; and a mobile molding belt for transferring and curing the partially intermixed liquid resins, the rotational body has a rotating shaft with a plurality of spaced wings and is rotated clockwise or counterclockwise in the partially intermixed liquid resins on the mobile molding belt to form a wave/wood pattern while the liquid resins are cured, said wings being fixed along the shaft of the rotating body and alternately approaching the bottom and the top of the liquid resins on the belt during the rotation of the rotating body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention contemplates a provision of a wave/wood pattern for artificial acrylic marble. The artificial acrylic marble is prepared from an acrylic composition comprising 10 to 40% by weight of a monomer such as methylmethacrylate, or a syrup of a mixture of monomer and polymer thereof (10 to 30% by weight polymer based on the weight of the syrup), 40 to 70% by weight of a filler such as aluminum hydroxide or calcium hydroxide, 0.5 to 5% by weight of a crosslinking agent, such as ethylene glycol dimethacrylate, t-ethyleneglycoldimethacrylate, and di-ethyleneglycoldimethacrylate, 0.5 to 5% by weight of a curing agent, such as t-butyl peroxymaleic acid, benzoyl peroxide, t-butyl hydroperoxide and acetyl peroxide, 0.1 to 10% by weight of a toner such as zinc oxide white and iron oxide black, and predetermined amounts of other well-known additives.

Two acrylic compositions, which are different in color, are mixed in respective vessels to have a viscosity of 1,000 to 60,000 cps. The viscosity of each composition may be controlled by changing the mixture ratio of the polymer in its syrup. Alternatively, viscosity controlling additives may be separately used.

The application of the preferred embodiments of the present invention is best understood with reference to the accompanying drawings.

Figure 1:
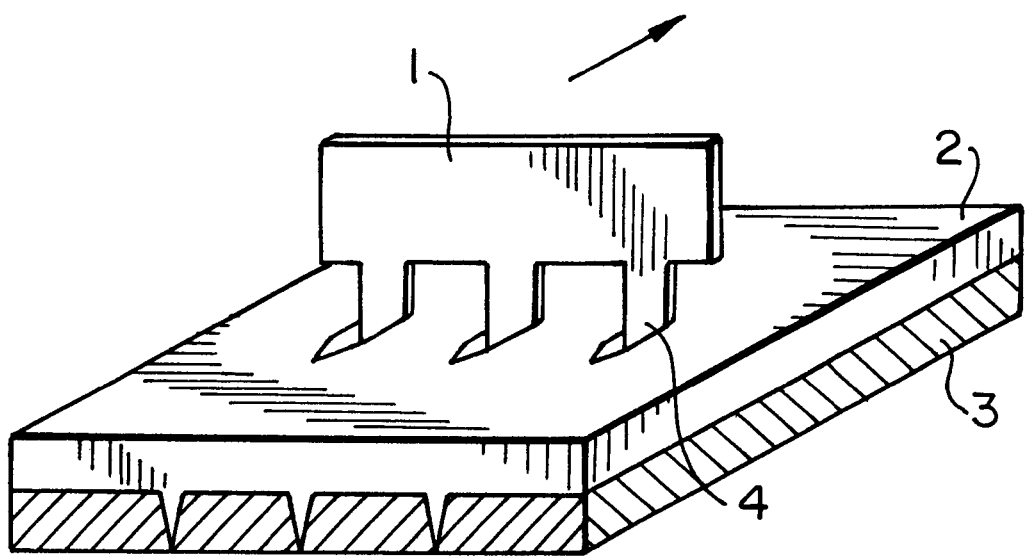
FIG. 1 is a schematic view showing forming a stripe pattern in artificial marble by use of a conventional comb-patterned tool.
Figure 2:
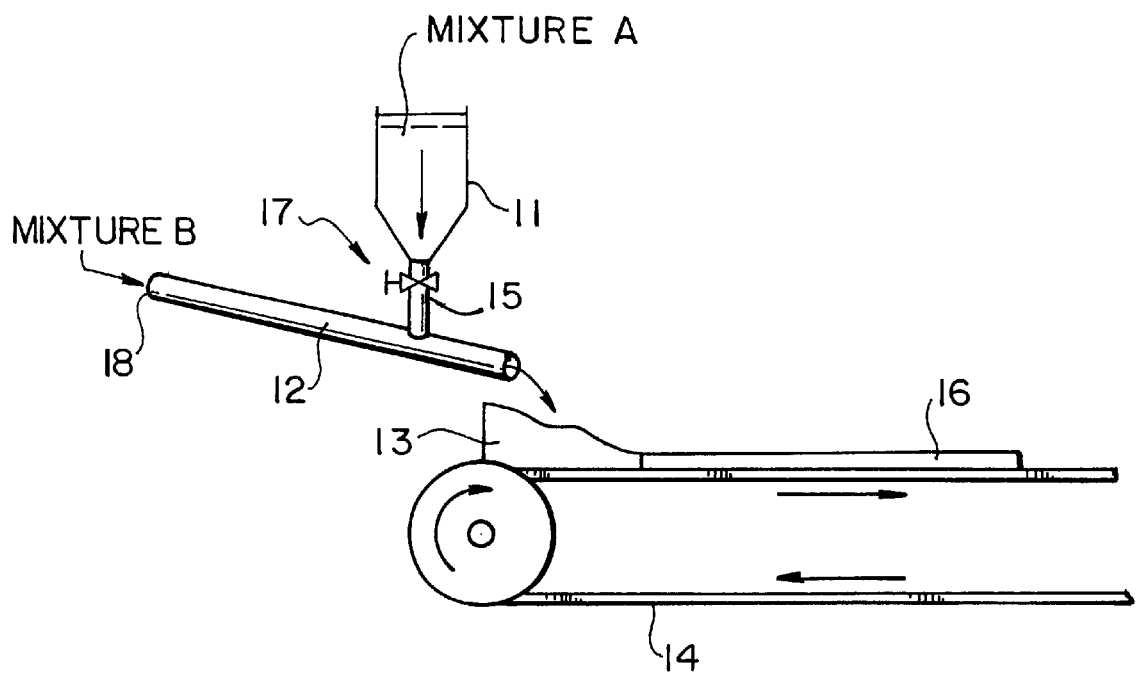
FIG. 2 is a schematic view showing a preparation flow of artificial marble in accordance with the present invention.

FIG. 2 schematically shows a process of preparing artificial marble in accordance with the present invention. As shown in FIG. 2, there are provided at least two mixtures A and B, which are different in color and viscosity from each other, through a first feeding hole (17) and a second feeding hole (18), respectively. While the mixture A is fed into a dam 13 under the guidance of a hose 12, the mixture A joins the stream of the mixture B via a hose connector 15. Therefore, the mixtures A and B are partially mixed with each other near the hose connector 15. With a predetermined length and a diameter (10 to 100 mm), the hose 12 is made of a material which is chemically stable to the mixtures. Suitable for use in such a hose is polyethylene or polyvinyl chloride. In addition, the hose 12 is swung right and left by means of a swinging tool(not shown).

In accordance with the present invention, the mixture A is preferably added at an amount as much as 10 to 80% of the mixture B. To the mixture A, the mixture B, or an admixture of the mixture A and the mixture B, artificial marble chips different in color from the above mixtures may be added at an appropriate amount in order to improve a marble sense to the eye. Any artificial marble chips which can be produced by those skilled in the art may be used in the present invention.

Figure 3:
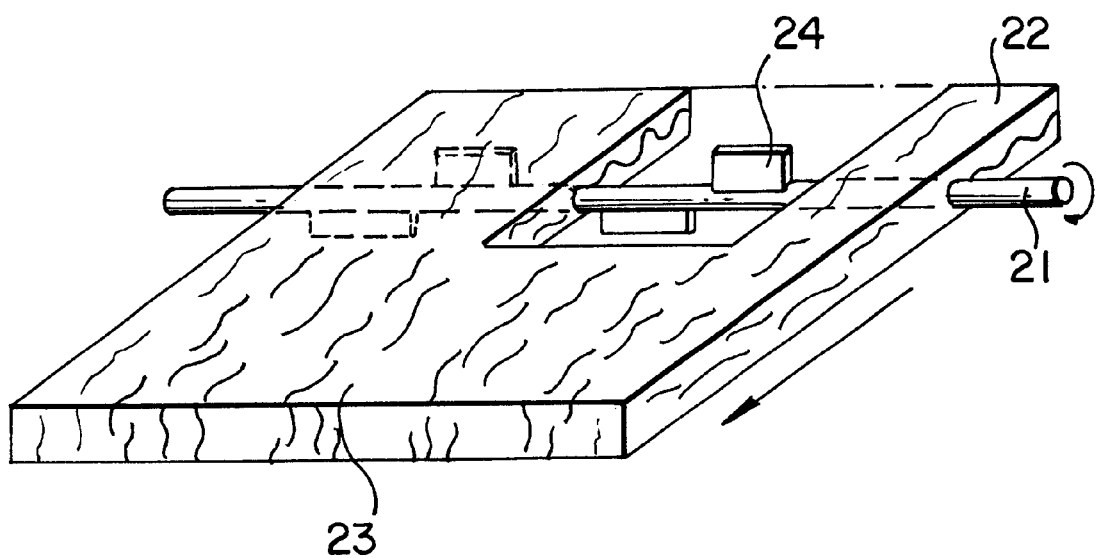
FIG. 3 is a schematic view showing forming a wood/wave pattern in artificial marble by use of a rotating body in accordance with the present invention.

The molding of artificial marble is usually accomplished by a continuous casting molding method as shown in FIG. 2. The present invention is to use a rotating body in the continuous casting molding method as illustrated in FIG. 3. In the continuous casting method, there are needed a mobile molding belt 14 (SUS), gasket (rubber) and a dam 13 for feeding the mixture onto the belt. As the belt 14 moves, the partially mixed liquid resin 22 is transferred while being cured to give artificial marble 16.

As for the rotating body 21, it comprises a rotating shaft with a plurality of spaced wings 24. The wings 24 are fixed randomly and differently from each other in the radial direction along the rotating shaft. Connected to the dam 13 upstream of the belt, the rotating body 21 may be rotated clockwise or counterclockwise with the aid of a power transmitting means. The wings may be rectangular, triangular, elliptical or mixture thereof in shape and vary, in number, from 1 to 20 or higher depending on conditions. When the wings with a rectangular shape are used to give wood patterns, each of the wings preferably ranges, in either length or width, from 5 to 500 mm. In addition, a different shape of wings (elliptical, triangle, etc) may be used therewith depending on the required patterns. If the width of the wing exceeds 500 mm, the two mixtures are so completely mixed that no patterns are expressed. The rotating body is set within the layered mixtures which are usually 5 to 20 mm thick in total. While the rotating body is rotated, each of the wings alternately approaches the vicinity of the belt and is in the upper resin layer, as shown in FIG. 3.

After coming out from the hose, the mixtures are fed upstream of the rotating body 21 in a stationary phase. When the mixtures are accumulated to a predetermined height, the belt is run with the rotating body being operated. The rotating body is preferably rotated at a speed of 5 to 100 revolutions per min. For instance, when the rotating speed is below 5 revolutions per min, patterns are only partially expressed on the marble. On the other hand, when the rotating speed exceeds 100 revolutions per min, the two mixtures are completely mixed so that no patterns are expressed.

The resin mixtures, which have their own colors and are partially mixed when being fed onto the belt, are further mixed in color as a result of the revolution of the wings. While the layered mixtures are cured, the upper layer is mixed with the lower layer by the wings. The cured artificial marble has different colors from part to part in some regions, expressing a wave/wood pattern 23.

A better understanding of the present invention may be obtained in light of the following examples which are set forth to illustrate, but are not to be construed to limit the present invention.

EXAMPLE I

A mixture A was prepared by mixing 35% by weight of a syrup consisting, by weight, of 80% of methylmethacrylate and 20% of polymethylmethacrylate, 55% by weight of aluminum hydroxide, 1% by weight of ethyleneglycoldimethacrylate, 1% by weight of t-butyl peroxymaleic acid, and 8% by weight of zinc oxide white. Separately, a mixture B was prepared by mixing 35% by weight of a syrup consisting, by weight, of 70% of methylmethacrylate and 30% of polymethylmethacrylate, 55% by weight of aluminum hydroxide, 1% by weight of ethyleneglycoldimethacrylate, 1% by weight of t-butyl peroxymaleic acid, and 8% by weight of zinc oxide yellow. In the apparatus shown in FIG. 2, these mixtures were respectively fed into the dam 13 and accumulated to the height of 150 mm upstream of a rotating body with five wings which all were 70 mm in length and 30, 50, 70, 50 and 30 mm in width, respectively. While the belt was moved, the rotating body was rotated at a speed of 50 revolutions per min. As a result, artificial marble with a beautiful wood/wave pattern was obtained.

By virtue of elegant appearance, light weight and easy processability, artificial acrylic marble can find numerous applications in the interior industry, such as kitchen tables, baths, various count tables and etc. Notwithstanding these advantages, artificial acrylic marble prepared by conventional methods is limited in application since it expresses poor patterns and color compared with a natural marble. In particular, when other component materials capable to express natural pattern and color of wood are used therewith, there are found discrepancies in pattern and color between artificial marble and said component materials, to give the articles aesthetical degradation.

The present invention, as described above, can provide new patterns like wood and wave patterns for artificial acrylic marble, so that the artificial acrylic marble can be aesthetically harmonized with wood materials.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing artificial acrylic marble by use of an apparatus comprising a rotational body and a liquid resin feeder, the method comprising the steps of:

introducing at least two liquid resins into the liquid resin feeder via at least two liquid resin inlets and partially intermixing the at least two liquid resins in the feeder, the liquid resins being different in color and viscosity from each other;

discharging through a single liquid resin outlet the partially intermixed resins onto a mobile molding belt used for transferring and curing the discharged partially intermixed resin, wherein the single liquid resin outlet alternately moves from side to side along the width of the mobile molding belt, and wherein the partially intermixed resins on the mobile molding belt have a bottom surface and a top surface; and curing the discharged partially intermixed resins on the mobile molding belt while passing the discharged partially intermixed resins through a rotational body thereby forming a wave/wood pattern in the discharged partially intermixed resins, the rotational body having a rotating shaft with a plurality of spaced wings and rotating clockwise or counterclockwise in the discharged partially intermixed liquid resins on the mobile molding belt to form the wave/wood pattern therein while the discharged partially intermixed liquid resins are cured, the wings being fixed along the shaft of the rotating body and alternately approaching the bottom surface and the top surface of the discharged partially intermixed liquid resins on the mobile molding belt during the rotation of the rotating body.

2. The method as set forth in claim 1, wherein the rotating body rotating at a speed of 5 to 100 revolutions per min.

3. The method as set forth in claim 1, wherein the wings are fixed randomly and differently from each other in the radial direction along the rotating shaft of the rotating body.

4. The method as set forth in claim 1, wherein the wing has a form of a rectangle, a triangle, an elliptical or mixtures thereof.

5. The method as set forth in claim 4, wherein the wing is rectangular and ranges from 5 to 500 mm in width and from 5 to 500 mm in length.

6. The method as set forth in claim 1, wherein the rotating body has wings of 1 to 20.

7. The method as set forth in claim 1, wherein both or either of the liquid resins further comprise at least one artificial marble chip.

* * * * *